US009577915B2

United States Patent
Hui et al.

(10) Patent No.: US 9,577,915 B2
(45) Date of Patent: Feb. 21, 2017

(54) RATE-LIMITING SAMPLES FOR ETX COMPUTATION IN COMPUTER NETWORKS

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 14/567,370

(22) Filed: Dec. 11, 2014

(65) Prior Publication Data

US 2016/0134514 A1   May 12, 2016

Related U.S. Application Data

(60) Provisional application No. 62/076,855, filed on Nov. 7, 2014.

(51) Int. Cl.
*H04L 12/721* (2013.01)
*H04W 40/12* (2009.01)

(52) U.S. Cl.
CPC ............ *H04L 45/12* (2013.01); *H04W 40/125* (2013.01)

(58) Field of Classification Search
CPC .......... H04L 45/48; H04L 45/02; H04L 45/22; H04L 41/12; H04W 84/18
See application file for complete search history.

(56) References Cited

U.S. PATENT DOCUMENTS

| 2005/0185632 A1* | 8/2005 | Draves | H04L 45/02 370/351 |
| 2008/0069034 A1* | 3/2008 | Buddhikot | H04W 40/14 370/328 |
| 2008/0075080 A1* | 3/2008 | Katabi | H04L 1/1671 370/392 |
| 2009/0003366 A1* | 1/2009 | Chen | H04W 40/14 370/406 |
| 2012/0099587 A1* | 4/2012 | Fan | H04W 40/16 370/389 |

(Continued)

OTHER PUBLICATIONS

Gnawali et al., "The Minimum Rank with Hysteresis Objective Function", Request for Comments 6719, Sep. 2012, 13 pages, Internet Engineering Task Force Trust.

(Continued)

*Primary Examiner* — Jung Park
(74) *Attorney, Agent, or Firm* — Parker Ibrahim & Berg LLC; James M. Behmke; Stephen D. LeBarron

(57) ABSTRACT

In one embodiment, a device in a network obtains information regarding a transmission between the device and a neighbor of the device in the network. The device determines whether to use the information regarding the transmission to update an expected transmission count associated with the neighbor based on a rate of samples used to compute expected transmission counts. The device updates the expected transmission count, in response to determining that the information regarding the transmission should be used to update the expected transmission count. The device selects a routing path in the network based in part on the updated expected transmission count associated with the neighbor.

26 Claims, 17 Drawing Sheets

(56) References Cited

U.S. PATENT DOCUMENTS

2012/0307653 A1* 12/2012 Vasseur ............... H04W 40/14
                                                    370/252
2013/0028103 A1*  1/2013 Hui ................... H04W 74/0808
                                                    370/252
2013/0028104 A1*  1/2013 Hui ....................... H04L 45/48
                                                    370/252
2013/0223229 A1*  8/2013 Hui ...................... H04W 40/02
                                                    370/238

OTHER PUBLICATIONS

Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Winter et al., "RPL: IPv6 Routing Protocol for Low-Power and Lossy Networks", Request for Comments 6550, Mar. 2012, 157 pages, Internet Engineering Task Force Trust.

* cited by examiner

RATE-LIMITING SAMPLES FOR ETX COMPUTATION IN COMPUTER NETWORKS

RELATED APPLICATIONS

This application claims priority to U.S. Provisional Application No. 62/076,855, filed Nov. 7, 2014, entitled: "RATE-LIMITING SAMPLES FOR ETX COMPUTATION IN COMPUTER NETWORKS," by Hui et al., the contents of which are herein incorporated by reference.

TECHNICAL FIELD

The present disclosure relates generally to computer networks, and, more particularly, to rate-limiting samples used to compute an expected transmission count (ETX) metric within a computer network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
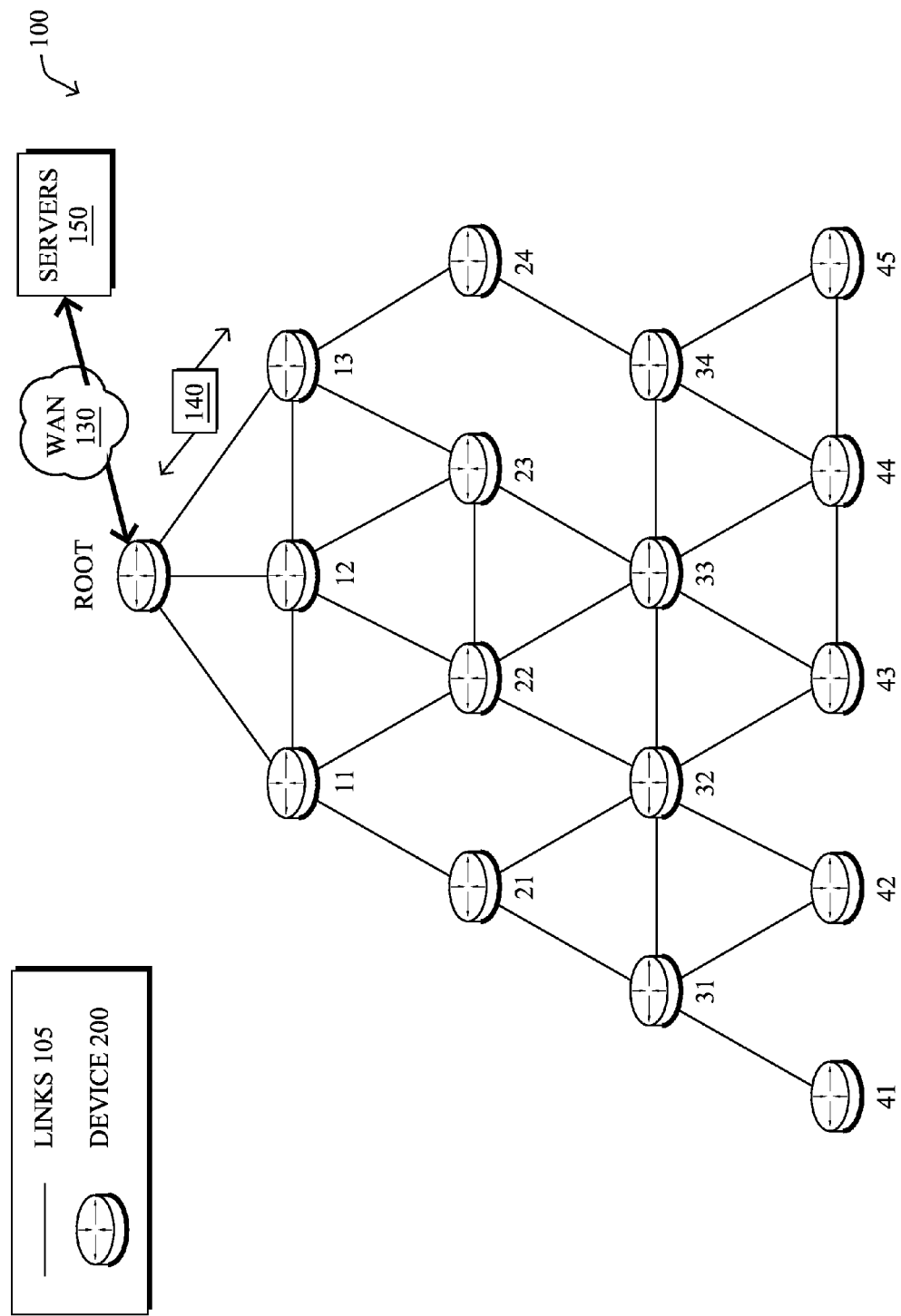
FIG. 1 illustrates an example communication network.

According to one or more embodiments of the disclosure, a device in a network obtains information regarding a transmission between the device and a neighbor of the device in the network. The device determines whether to use the information regarding the transmission to update an expected transmission count associated with the neighbor based on a rate of samples used to compute expected transmission counts. The device updates the expected transmission count, in response to determining that the information regarding the transmission should be used to update the expected transmission count. The device selects a routing path in the network based in part on the updated expected transmission count associated with the neighbor.

In further embodiments, a first device in a network receives data indicative of an estimated transmission count (ETX) strategy used by a second device in the network to compute ETX metrics. The first device determines whether the ETX strategy used by the second device should be adjusted. The first device causes the second device to adjust the ETX strategy, in response to a determination that the ETX strategy used by the second device should be adjusted.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
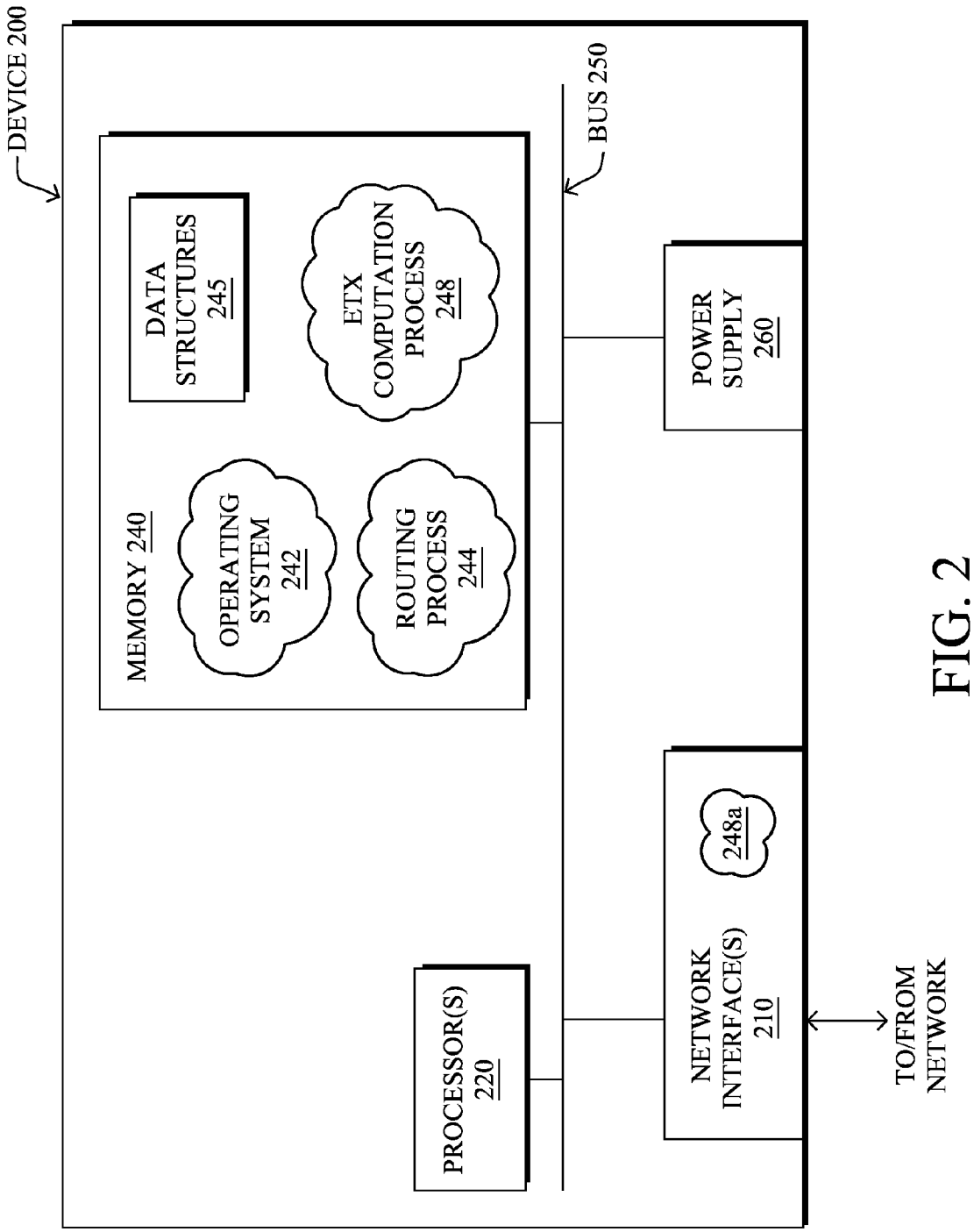
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative expected transmission count (ETX) computation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
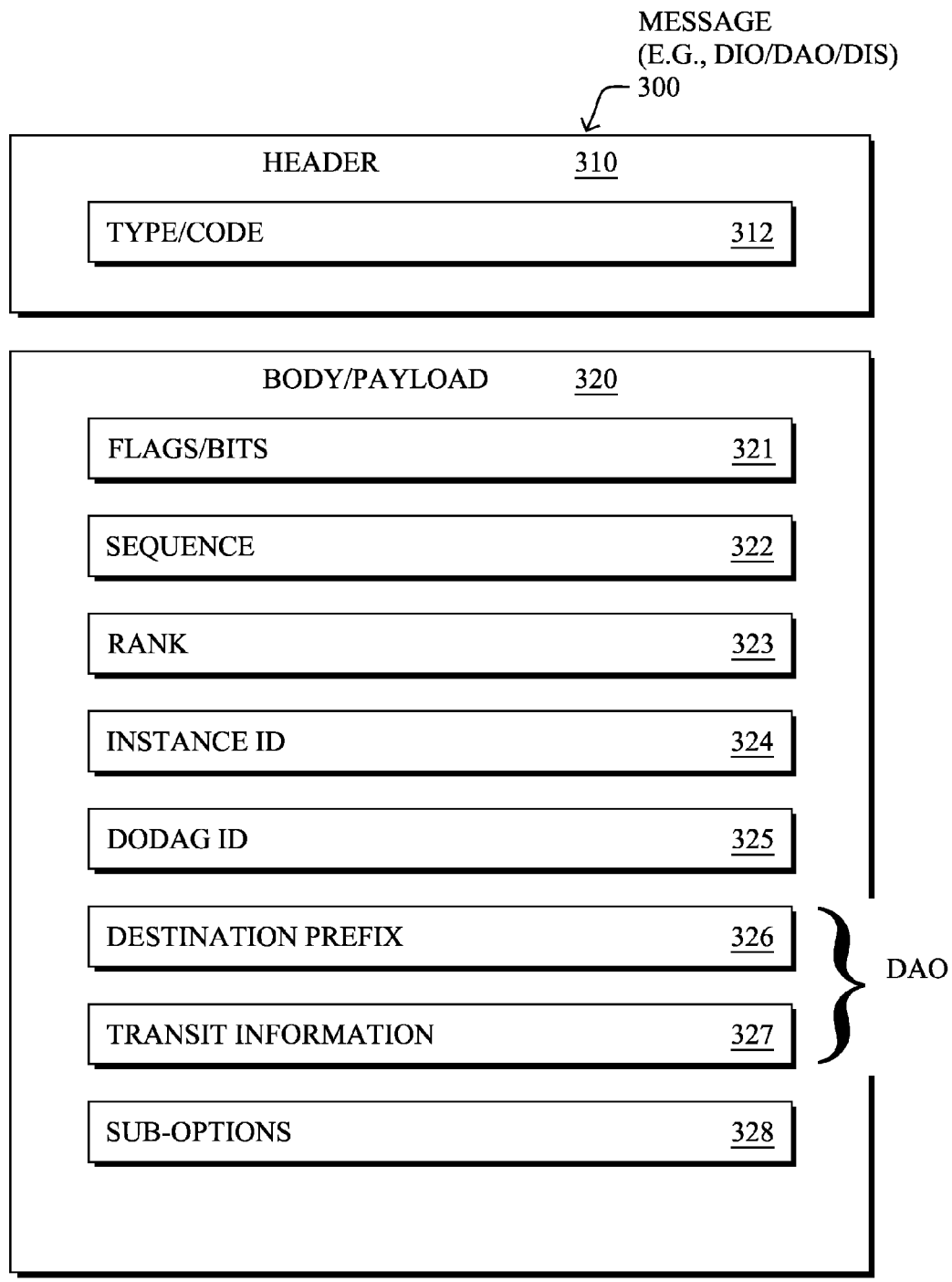
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
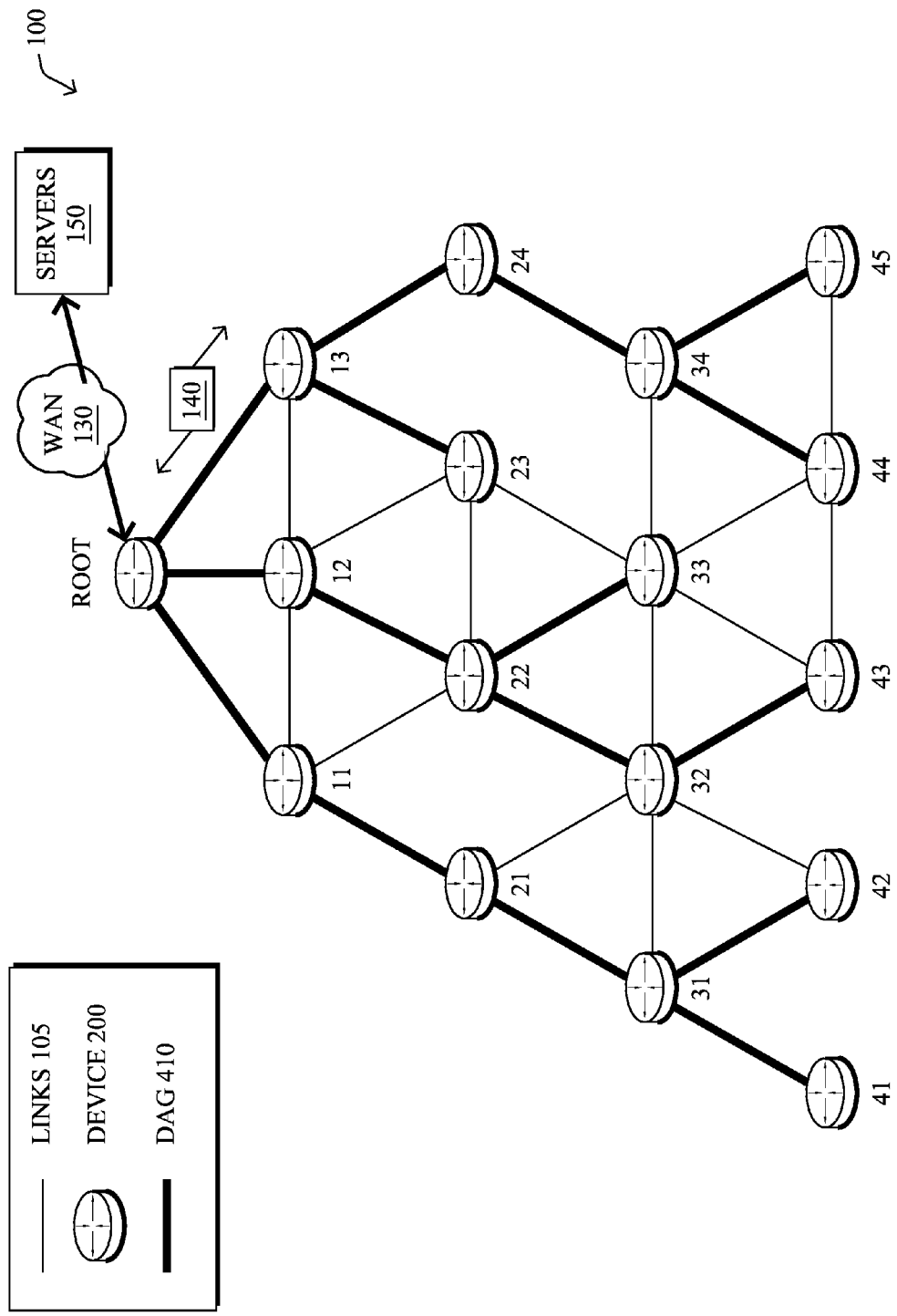
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, the expected transmission count (ETX) is a path metric widely used to select routes in LLNs (e.g., during formation of a DAG based on an objective function). In general, the ETX metric is a measure of link reliability and can be typically computed as the inverse of the packet success rate. Intuitively, an ETX metric is the expected number of transmissions needed to successfully deliver a packet to a neighbor and, in response, receive an acknowledgment from the neighbor. For example, if the packet success rate is 1.0 (100%), then the ETX is 1. Similarly, if the packet success rate is 0.5 (50%), then the ETX is 2. In a typical implementation, an ETX metric is calculated based on a measured packet success rate across a given link. For example, a device may calculate an ETX by counting the number of attempted transmissions and received acknowledgements across the link.

In some cases, a device that computes ETX metrics may base the calculations on all transmissions and acknowledgements associated with a given link. Other implementations, however, may apply some filtering to these values by applying an exponentially weighted moving average (EWMA). The EWMA method involves capturing the ETX for a predetermined number of packets and/or a specified time window. Then, the device updates the averaged ETX using a linear combination (e.g. $ETX_{avg} = a*ETX_{avg} + (1-a)*ETX_{new}$). The EWMA serves to apply some stability to the ETX metric by factoring in past results with the most recent results. In general, using an EWMA to calculate an ETX metric allows for a tradeoff in metric stability vs. responsiveness. Notably, routing protocols tend to operate better when the routing metric is more stable. However, if the metric is not responsive enough, converging towards a set of optimal routing paths may also be more costly and can take longer.

Transmission bursts may significantly affect a computed ETX metric. In particular, interference and link characteristics have high temporal locality. In other words, the success/failure rates of packets that are transmitted close in time are highly correlated. For example, if there is interference preventing a successful transmission, a device may attempt to retransmit the packet a number of times until the device either gives up or the transmission is finally successful. In another example, a technique that has been used in LLNs is to employ packet trains, where a device minimizes the random backoff for subsequent packets based on the success of the prior packet. As a result, the number of samples used as input in the ETX computation can increase rapidly in a short amount of time. Furthermore, the samples may be heavily skewed towards representing the link quality during a packet bursts, rather than the overall link quality. In addition, allowing such bursts to affect the ETX computation also results in greater variance. While the EWMA may be adjusted to apply more smoothing of the inputs, doing so also reduces the responsiveness of the average computed ETX metric.

Rate-Limiting Samples for ETX Computation

The techniques herein provide a method for rate-limiting the samples that are used by a network device to calculate an ETX, which may provide a better characterization of the link quality and reduce variance that can affect route selection. In one aspect of the techniques herein, a device/node may apply a rate limiter to determine what transmission attempts are used as input in an ETX computation. In another aspect, the node/device may reset the rate limiter when switching channels in a channel-hopping system. In a further aspect, the node/device may reset the rate limiter when detecting a significant change in activity on the media. In another aspect, the node/device may dynamically change the rate limiter parameters (e.g., the ETX computation strategy), depending on the total number of samples fed into the ETX computation. In yet further aspects, a node/device may report its ETX computation strategy to a supervisory device that is configured to adjust the ETX computation strategies used by individual nodes/devices in the network.

Illustratively, the techniques described herein may be performed by hardware, software, and/or firmware, such as in accordance with the ETX computation process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Specifically, a device in a network obtains information regarding a transmission between the device and a neighbor of the device in the network. The device determines whether to use information regarding the transmission to update an expected transmission count associated with the neighbor based on a rate of samples used to compute expected transmission counts. The device updates the expected transmission count, in response to determining that the information regarding the transmission should be used to update the expected transmission count. The device selects a routing path in the network based in part on the updated expected transmission count associated with the neighbor.

Operationally, a network node/device (e.g., device 200) may apply a rate limiter (e.g., as part of ETX computation process 248), to determine which samples are used to perform an ETX computation. In some embodiments, the rate limiter may be reset when device or network conditions change. For example, the rate limiter may be reset when the node switches to different channels in a channel-hopping system. In another embodiment, the rate limiter may be reset when there is a significant change in channel activity on the channel used by the node. The rate limiter parameters may also be adjusted dynamically based on the total number of samples already used as input to the ETX computation, allowing for initial quick estimate with greater stability over time.

Figure 5A:
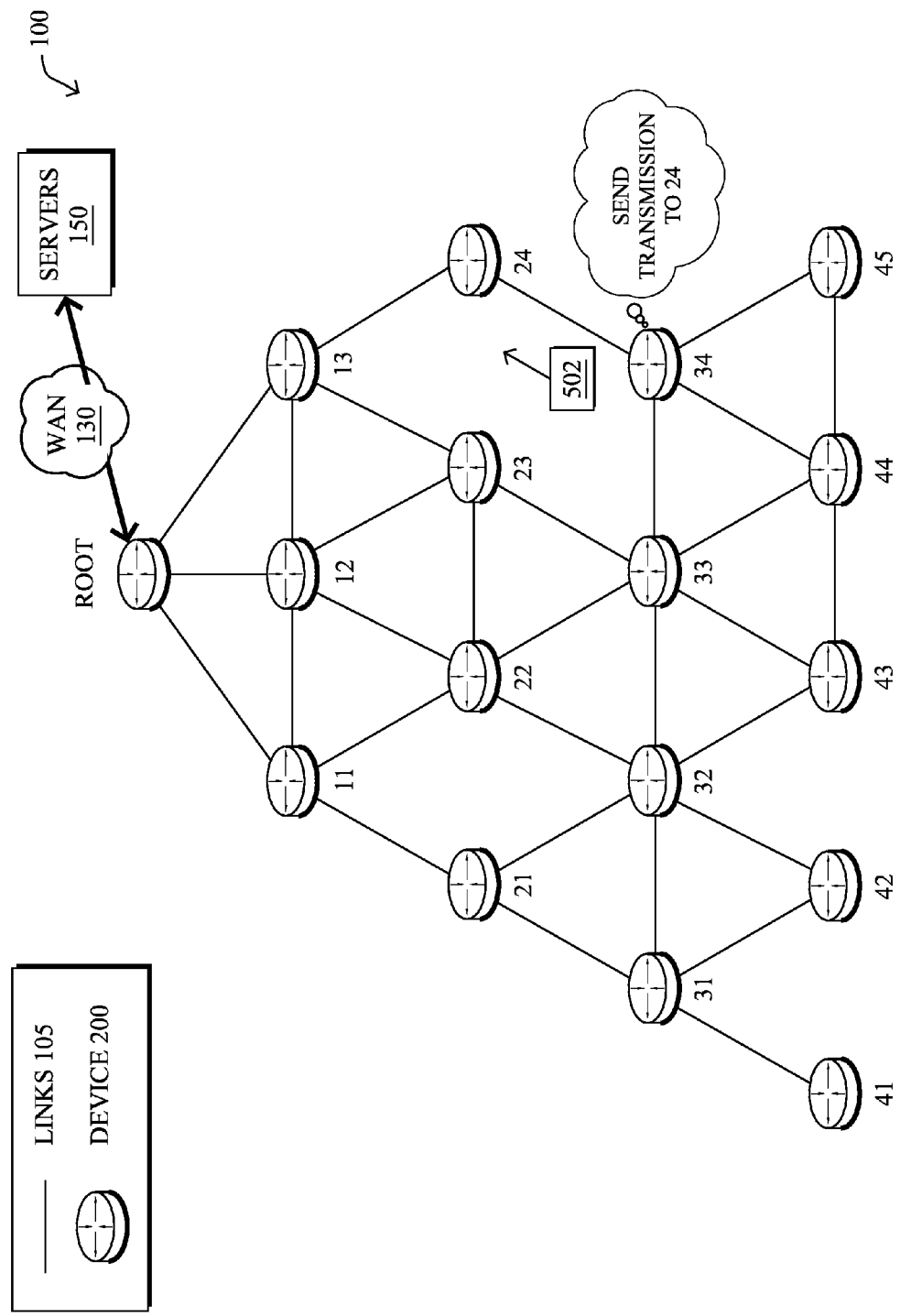
FIG. 5A-5E illustrate examples of using an expected transmission count (ETX) in a network.
Figure 5B:
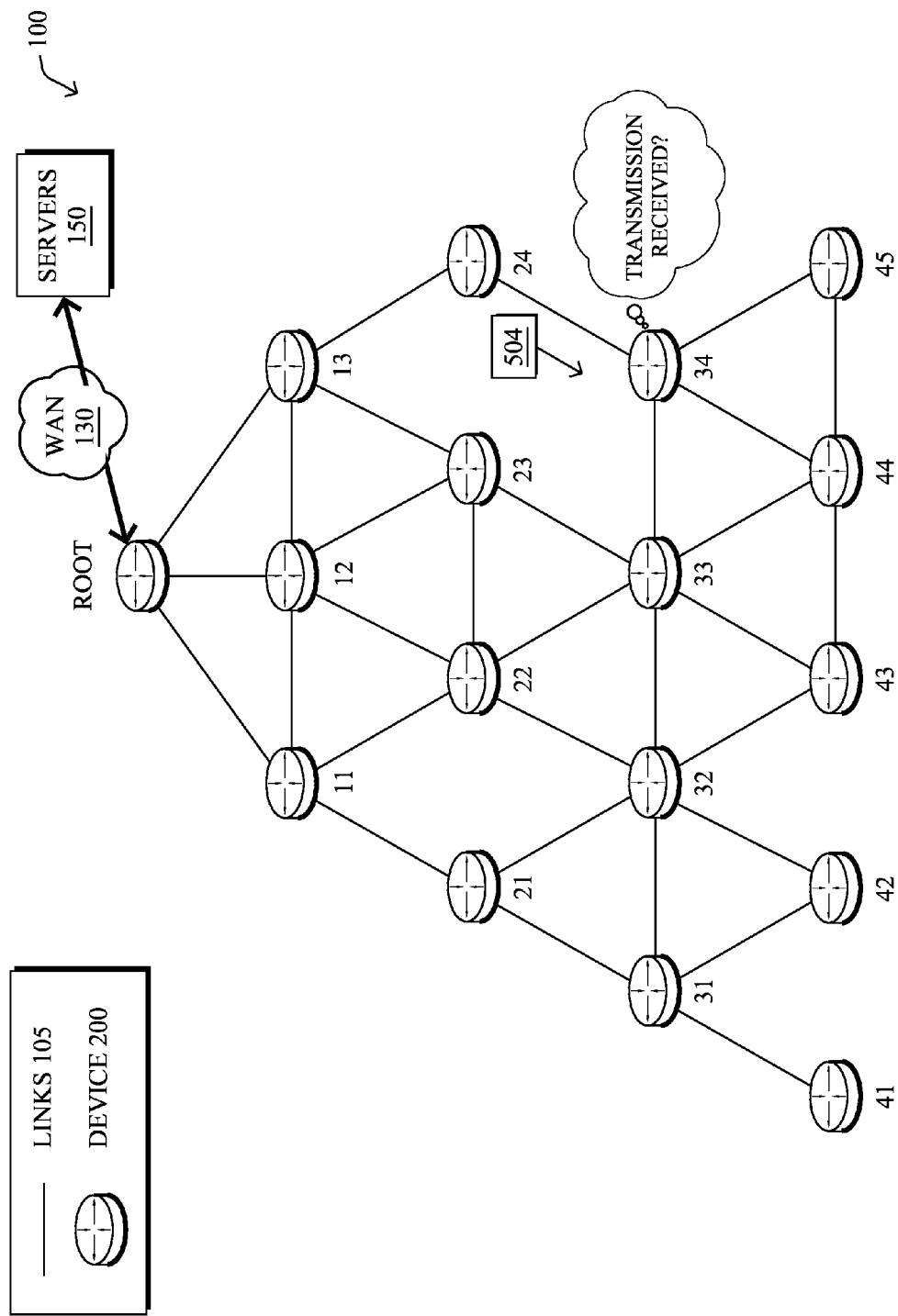

Referring now to FIG. 5A-5E, examples are shown of an expected transmission count (ETX) being used in a network, according to various embodiments. As shown in FIGS. 5A-5B, assume that node 34 transmits data 502 to node 24. In response, node 24 may be configured to send an acknowledgement 504 that indicates that node 24 successfully received transmission 502. If transmission 24 was not received, however, no acknowledgement 504 will be sent.

As shown in FIG. 5B, node 34 may determine whether or not it received acknowledgement 504 (e.g., within a predefined timeframe). In various embodiments, node 34 may use information regarding transmission 502 (e.g., whether the transmission was successful) as a single sample for purposes of computing an ETX associated with node 24. In another embodiment, nodes may identify the number of retries when sending a transmission to another node. For example, assume that transmission 502 is the second attempt that node 34 is making to reach node 24. In such a case, node 34 may include this count in transmission 502. In turn, node 24 may use this information as a potential sample when computing its ETX metric for node 34.

Figure 5C:
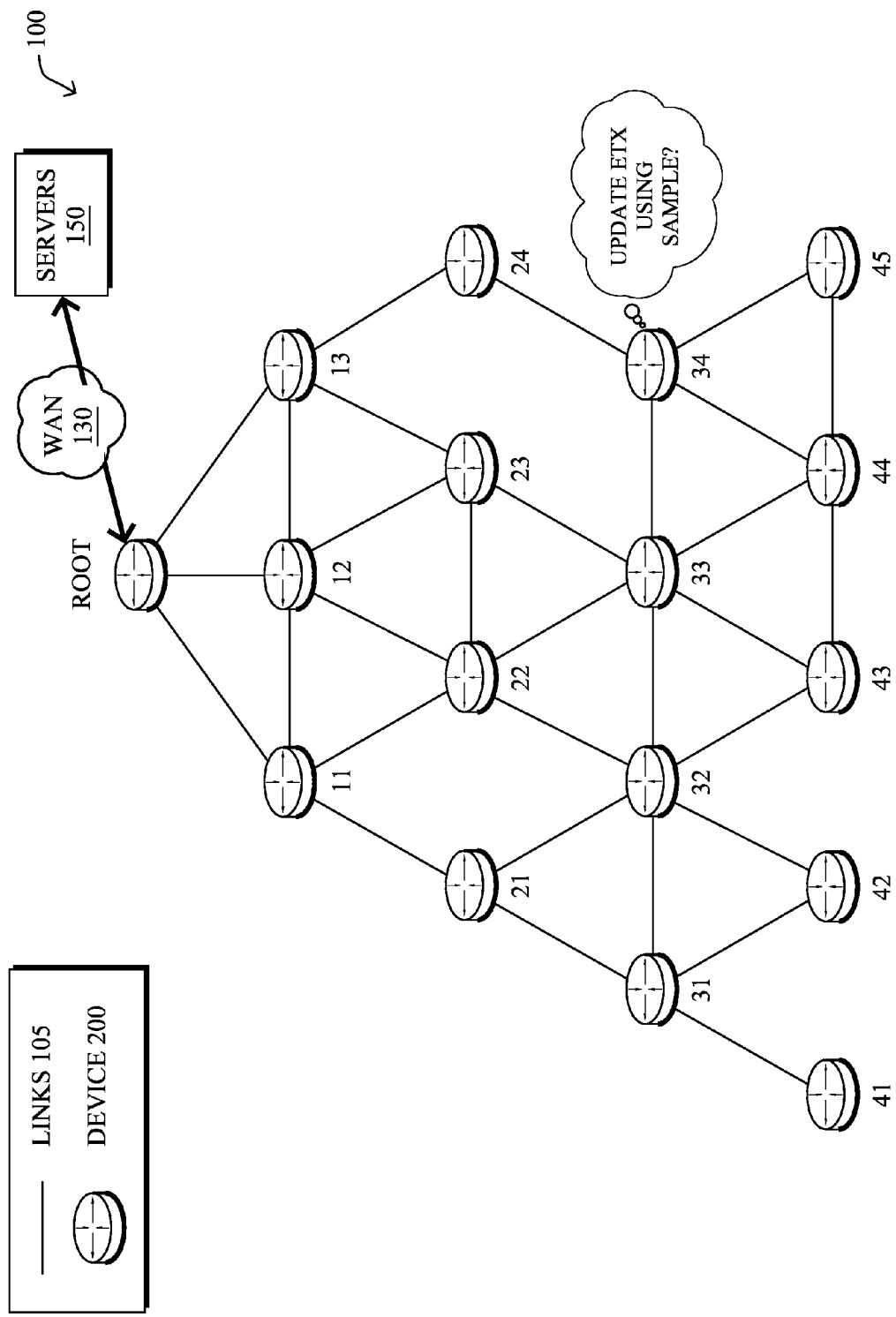
Figure 5D:
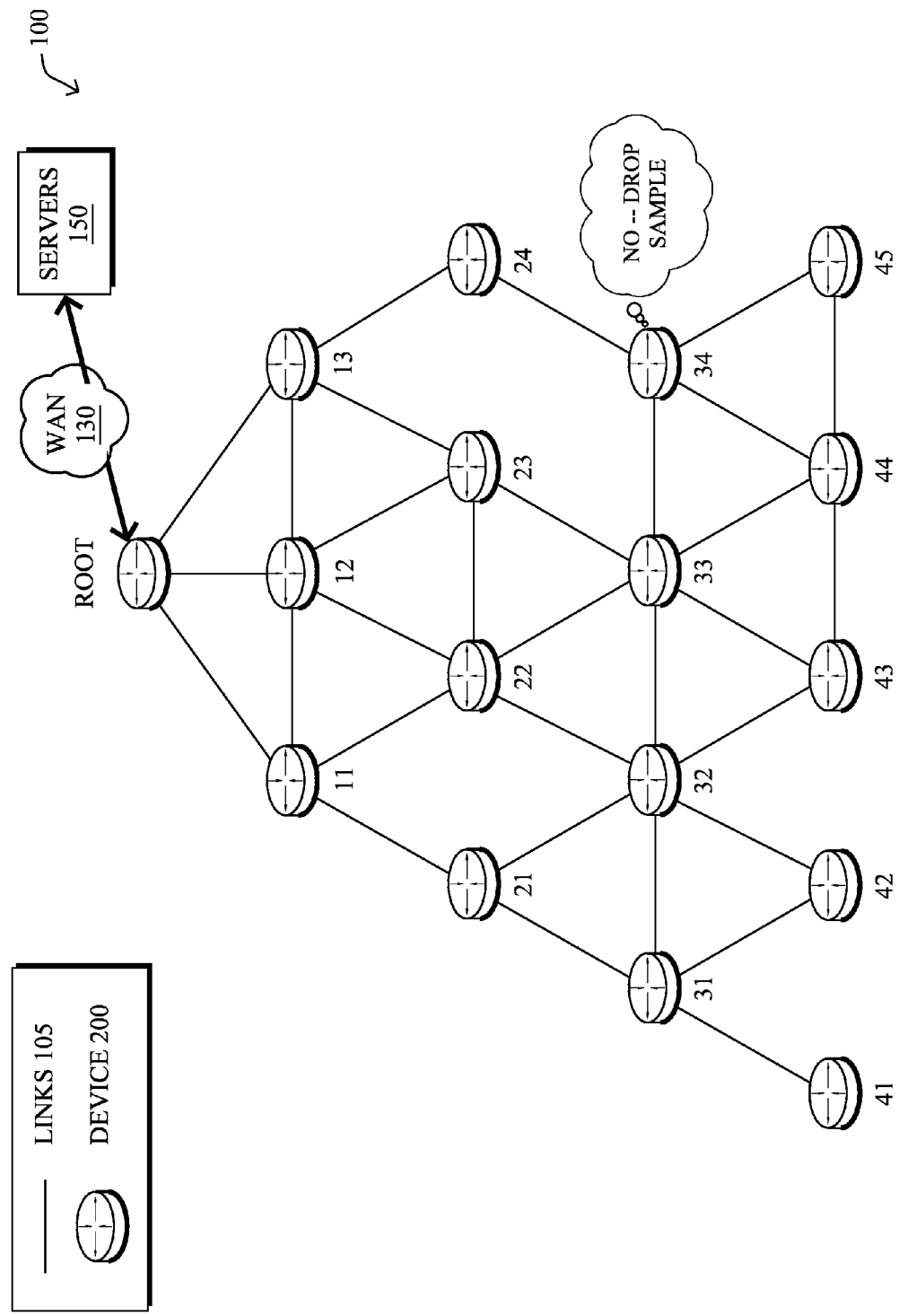

In various embodiments, a node may be configured to determine whether or not to use a particular sample when computing an ETX metric. In particular, ETX computation process 248 executed by a device/node may also be operable to function as a rate limiter for samples obtained by the node. For example, as shown in FIG. 5C, node 34 may determine whether or not information regarding transmission 502 should be used to compute/update the ETX metric associated with node 24. If the rate of samples used as input to the ETX calculation exceeds a threshold rate, node 34 may then drop the ETX sample from being used to compute or update the ETX metric associated with node 24, as shown in FIG. 5D. As would be appreciated, rate limiting the samples fed into the ETX computation may prevent large bursts of traffic (e.g., due to quick retransmissions, packet trains, etc.) from biasing the results.

In one embodiment, a node may rate limit ETX samples by employing a timeout mechanism. Such a timeout mechanism may prevent the use of ETX samples obtained for a set period of time after a particular sample is used. For example, if node 34 determines that it should use information regarding transmission 502 to calculate an ETX metric, it may prevent information regarding any subsequent transmissions to node 24 that occur within the next n-number of seconds after transmission 502 from being used as input to the ETX calculation. In some cases, "n" may be a configurable parameter that may be adjusted to control how much or how little rate limiting is applied to the ETX samples of the node.

In another embodiment, and more generally, a node may rate limit ETX samples using a token bucket mechanism, whereby a token is added to the bucket at a fixed rate. Whenever tokens are available during a transmission attempt, the node may remove a token from the bucket and use the sample information associated with the token as input to its ETX calculation. Similar to using a delay mechanism, the number of tokens used in the mechanism may be a configurable parameter that may be adjusted to control the degree of rate limiting applied to the ETX samples.

Figure 5E:
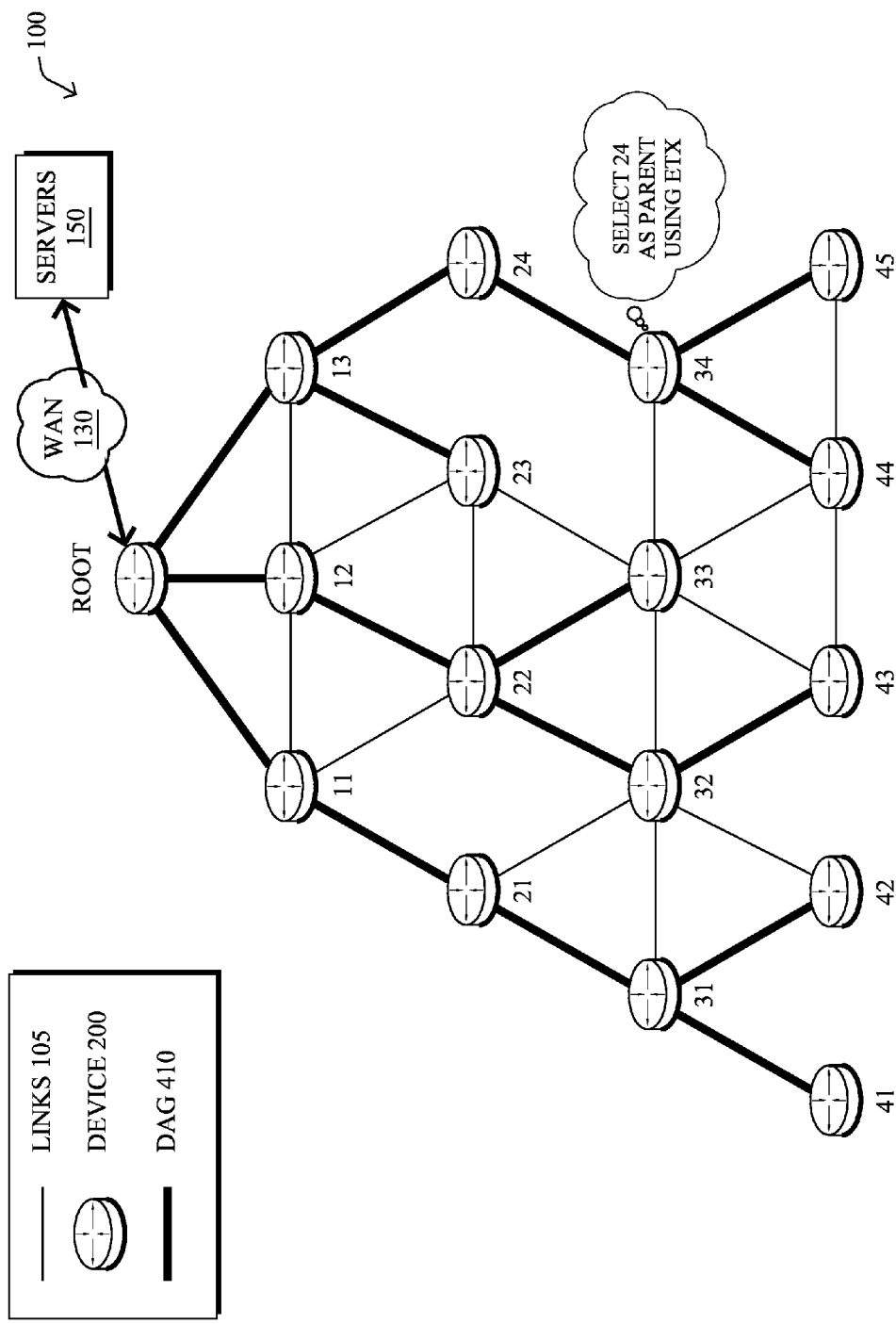

As noted previously, a node may base its routing decisions in part on the ETX metrics that it calculates for its one or more neighbors. Thus, depending on the objective function used in the network, the node may select a different parent node. For example, as shown in FIG. 5E, node 34 may opt to use node 24 as its parent node in DAG 410 for purposes of routing some or all of the data transmitted by node 34. If, however, the ETX metrics associated with node 24 are below an acceptable threshold, node 34 may instead initiate a routing change (e.g., to use a different parent node).

Figure 6A:
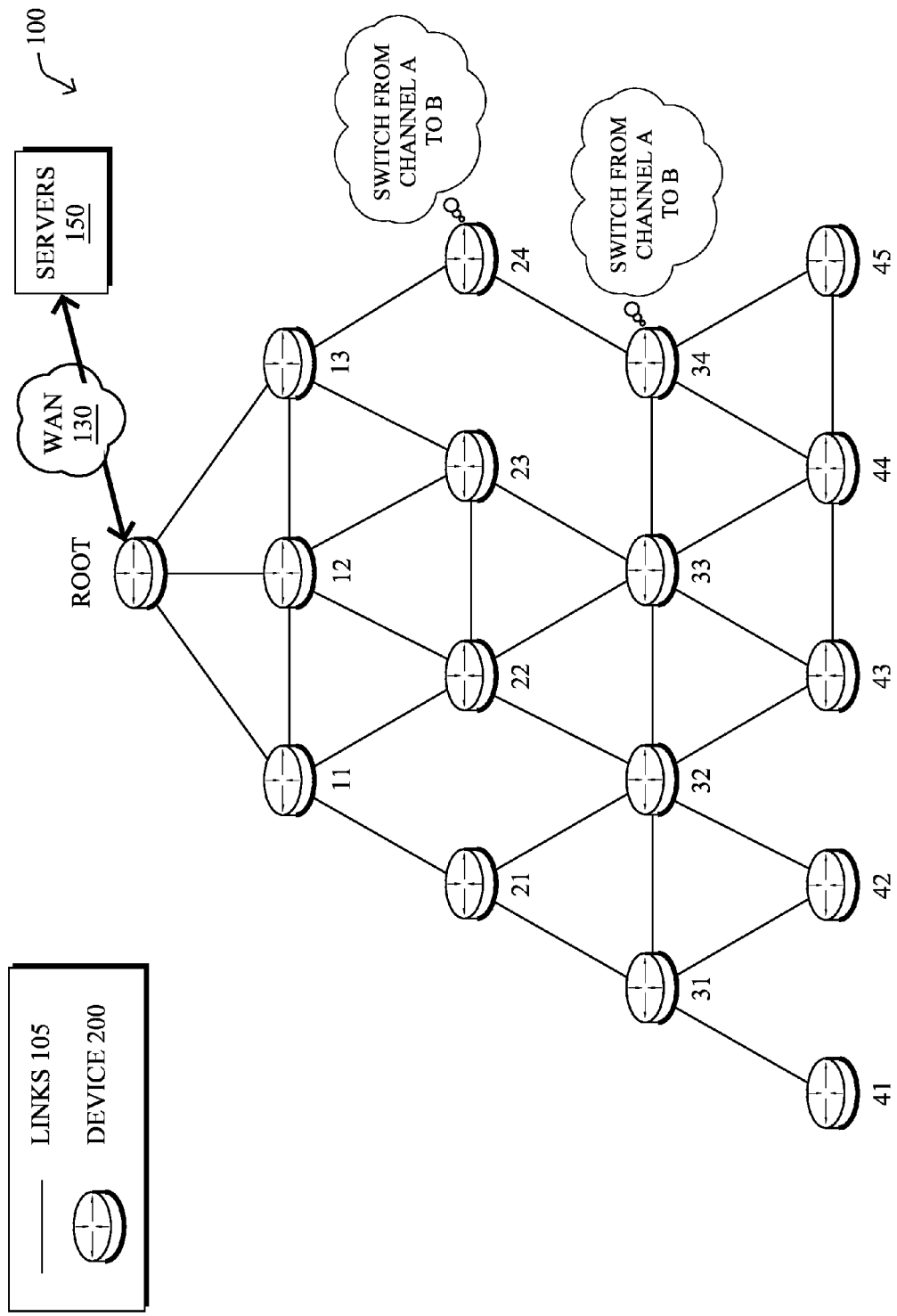
FIGS. 6A-6B illustrate an example of a node calculating an ETX after a channel hop.
Figure 6B:
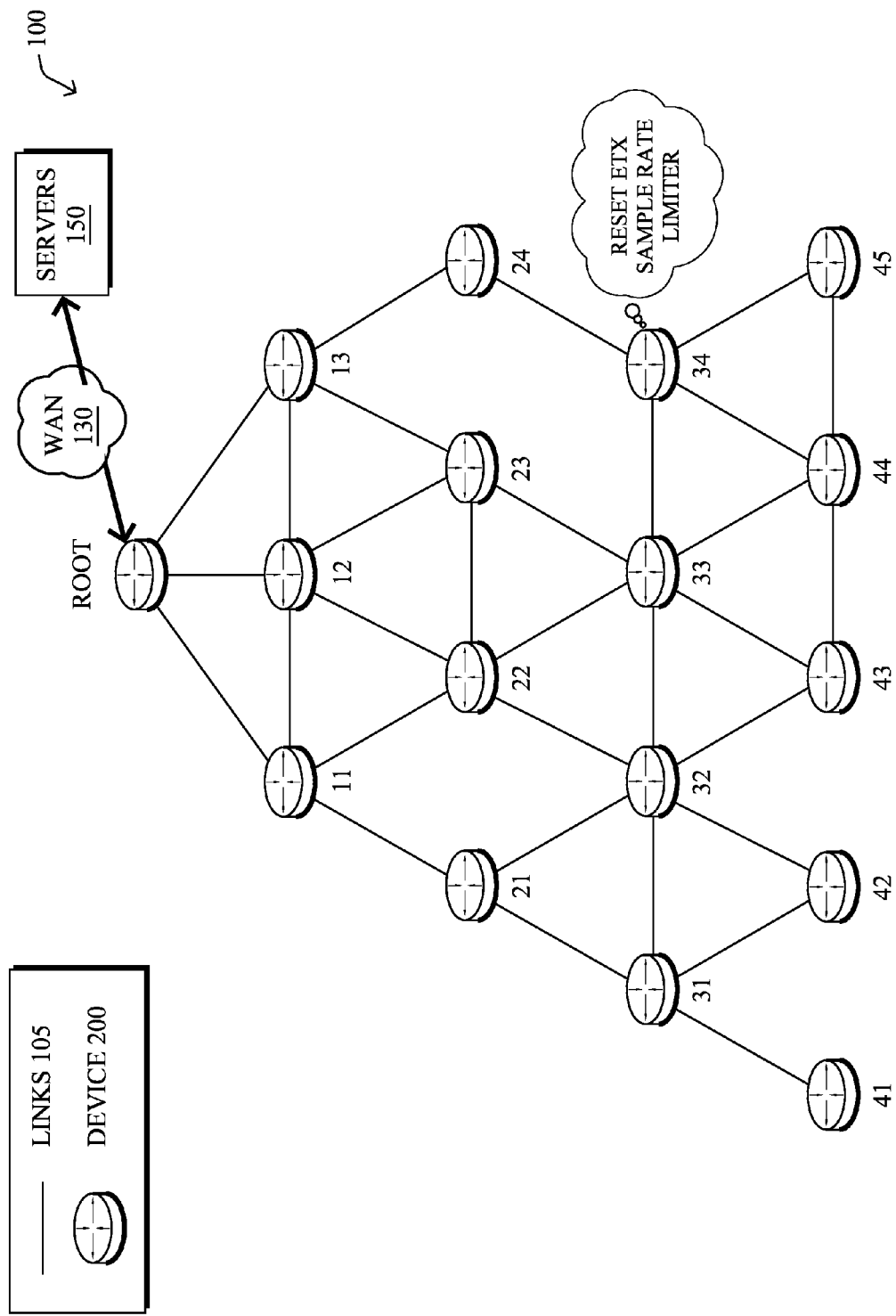

In some embodiments, a node may reset its rate limiter when switching to a different channel, if channel/frequency hopping is used for communications between nodes. For example, FIGS. 6A-6B illustrate an example of a node calculating an ETX after a channel hop. As shown in FIG. 6A, assume that node 24 and node 34 hop from a first channel 'A' to a second channel 'B,' according to the reception schedule of node 24. In such a case, node 34 may reset its ETX sample rate limiter, thereby allowing samples taken with respect to channel 'β' that may otherwise be dropped (e.g., due to the rate limiter) to be used to calculate or update the ETX metric associated with node 24.

In some embodiments, a node may reset its ETX sample rate limiter in conjunction with a channel hop by resetting its timeout or refilling its token bucket after the dwell time expires. In another embodiment, the node may maintain separate rate limiters for each channel of its communication schedule and reset its active rate limiter by changing to the rate limiter that corresponds to the new channel, whenever the node hops channels. While such an implementation would cause the node to retain more state, it would also handle situations better in which the channel hopping schedule returns to the same channel after a short period of time.

Regardless of how the node resets its rate limiter after hopping channels, doing so may address situations in which the different channels experience different degrees of interference. For example, when attempting to send a packet, node 34 may choose to make multiple transmission attempts on channel A before attempting to transmit to node 34 on channel B. In such a case, node 34 may only use one sample for channel A as input to its ETX computation, then another sample after switching to channel B.

Figure 7A:
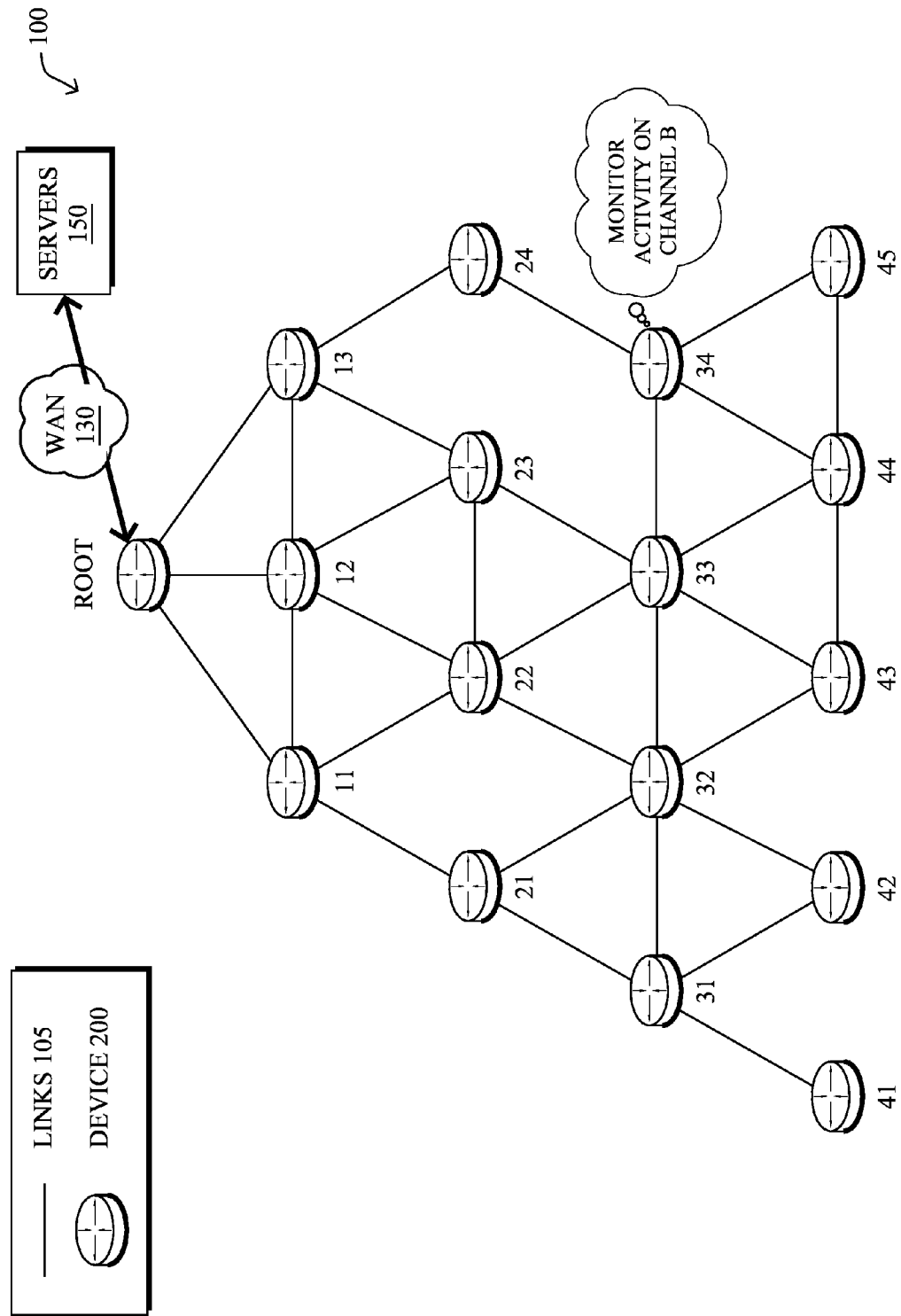
FIGS. 7A-7C illustrate an example of a node calculating an ETX based on channel activity.
Figure 7B:
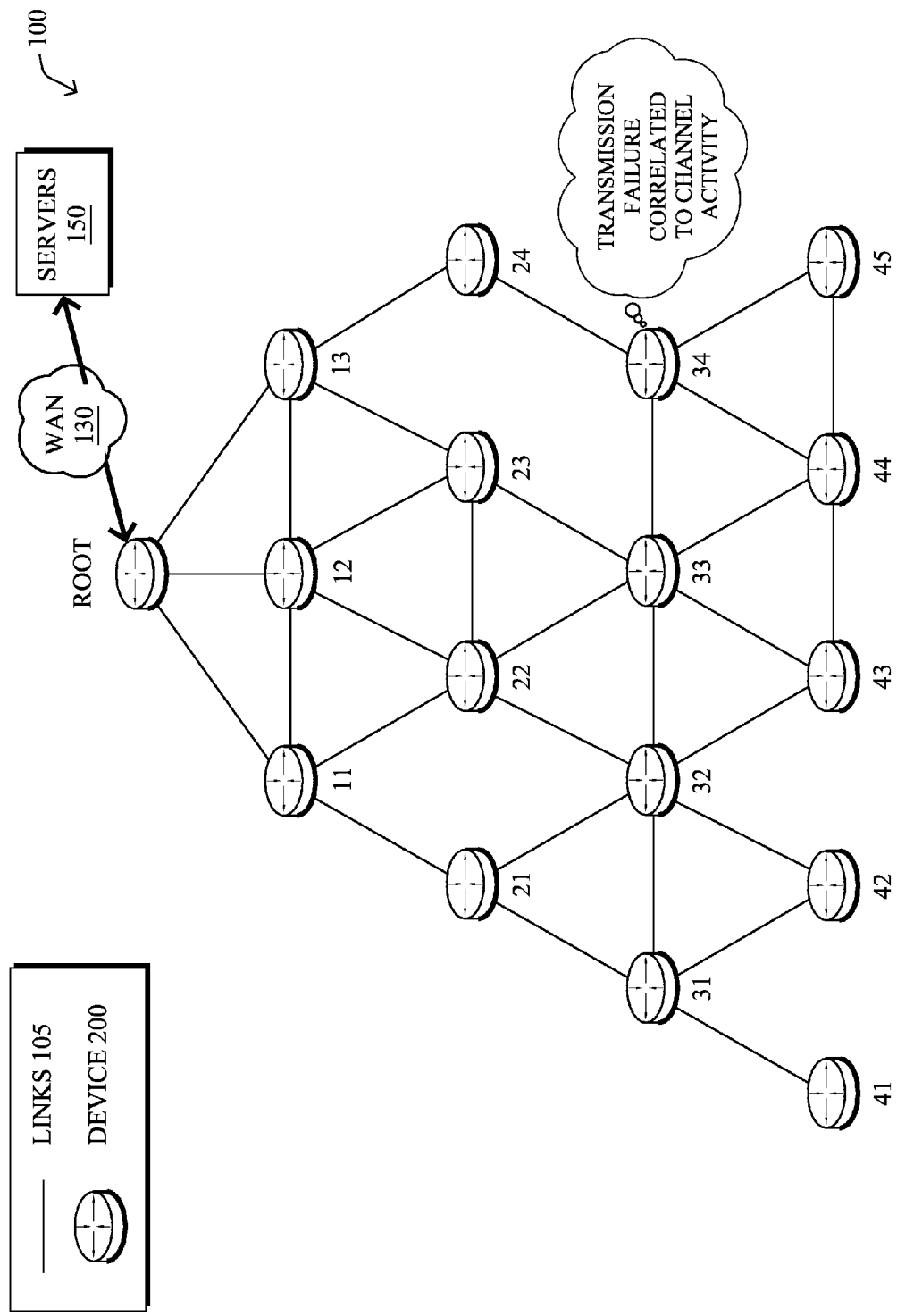

Another situation in which a node may reset its rate limiter is when the node detects a change in channel activity, according to various embodiments. For example, FIGS. 7A-7B illustrate an example of a node calculating an ETX based on channel activity. As shown in FIG. 7A, node 34 may monitor the activity on a particular channel (e.g., channel B) that is used to communicate with node 24. In one embodiment, a node may monitor channel activity by periodically measuring the received signal strength and/or as part of each transmission attempt (e.g., using clear channel assessment, etc.). In another embodiment, a node may monitor the number of preamble and start frame delimiter (SFD) detection events that are associated with the channel, to determine the channel activity. In yet another embodiment, a device may obtain feedback of activity from the receiver (e.g., by piggybacking information in a returned acknowledgment, such as acknowledgement 504).

Figure 7C:
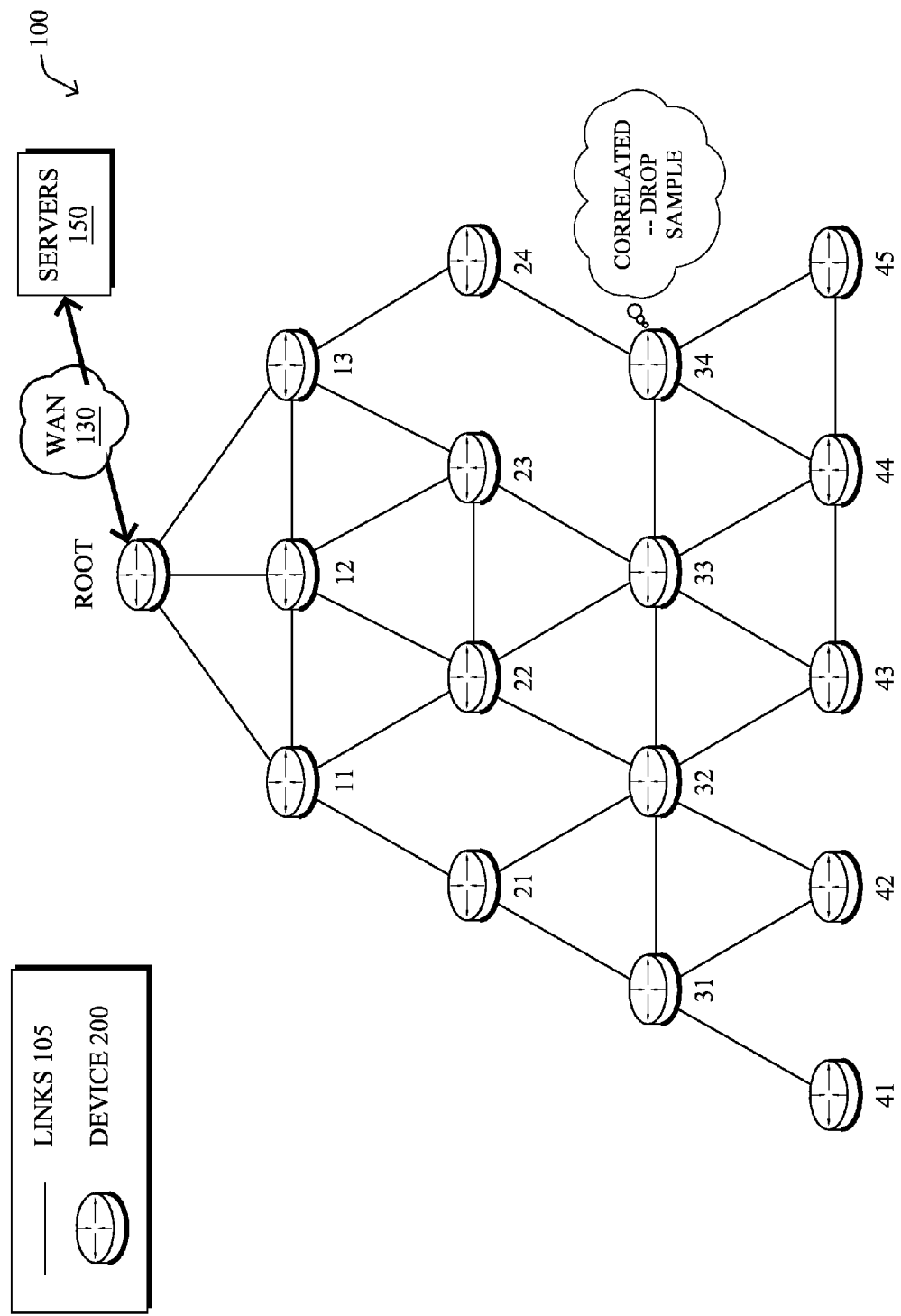

With better information about channel activity, a node can determine whether or not transmission failures are caused by the same interference event. For example, as shown in FIG. 7B, node 34 may determine whether a particular transmission failure (e.g., an ETX sample) is correlated to the channel activity. If the node determines that the activity has not reduced, and that repeated retransmissions continue to fail, the device may not feed the retransmissions as samples into the ETX computation. For example, as shown in FIG. 7C, node 34 may drop a particular ETX sample for use in its ETX calculation, based on how correlated the sample is to other ETX samples and the channel activity. Conversely, if the node detects that activity has reduced significantly and that a retransmission still fails, the node may use the retransmission as input for its ETX computation.

In yet another embodiment, a node may use a lightweight machine learning processes to determine event correlation. For example, node 34 may use principal component analysis (PCA) or another such technique to determine event correlation. In general, PCA attempts to transform a set of samples that are possibly correlated into a set of principal components, which are linearly uncorrelated. Employing PCA would allow the node to determine the degree of correlation between repeated retransmissions and prevent samples from being used to compute or update its ETX metric, as needed. Other machine learning techniques that can be used may include clustering techniques or any other technique suitable to determine the correlation between events. While PCA and other machine learning techniques may be used for purposes of rate limiting ETX samples, may LLN devices may not have the computational resources to implement these processes. Thus, using machine learning techniques to rate limit ETX machines may be reserved for higher end (e.g., more capable) devices in the network.

In some cases, a node may adjust its rate limiter parameters based on the total number of samples that it has used as input to its ETX calculation process. For example, when a node first discovers a neighbor, the node may choose to disable its ETX sample rate limiter or, more generally, increase the rate of samples used to perform the ETX computation. This allows the node to generate an ETX estimate more quickly, albeit with the possibility of introducing greater variance. When the number of samples crosses a threshold, the node may switch to using a lower rate of feeding in ETX samples into the computation. More generally, the node may reduce the rate of samples used in the computation over time.

Figure 8A:
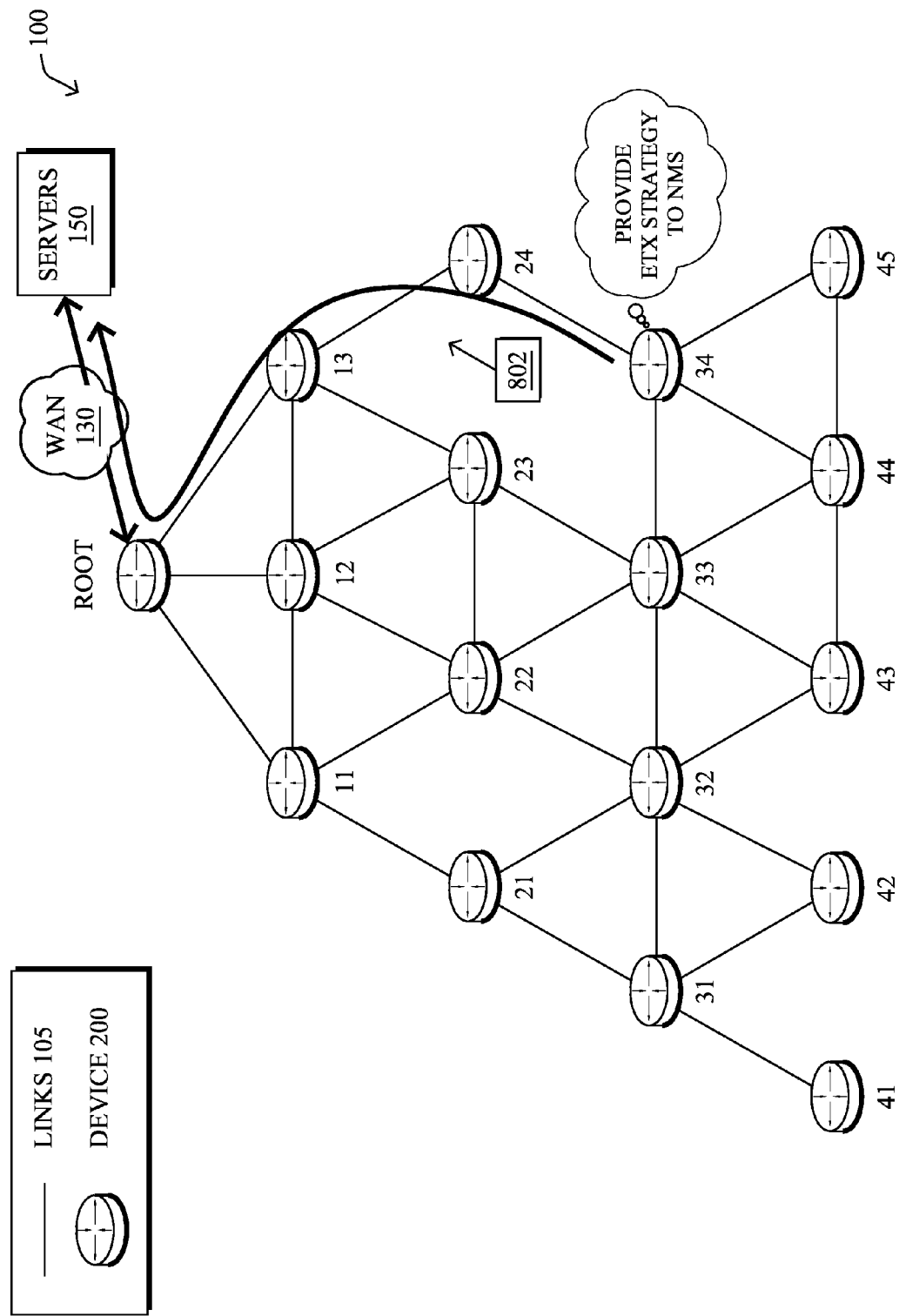
FIGS. 8A-8B illustrate an example of an ETX computation strategy of a node being adjusted by a supervisory device.
Figure 8B:
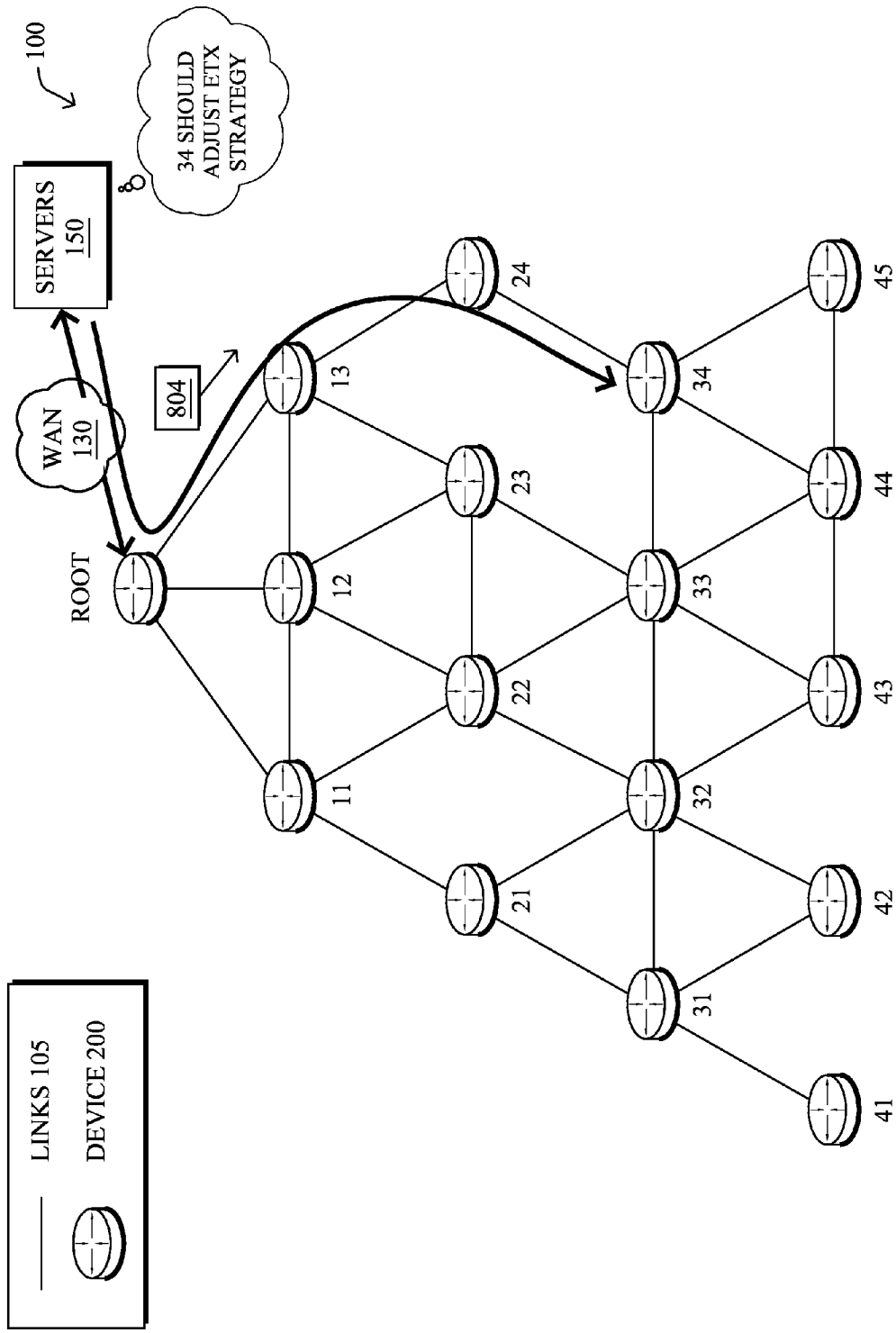

Referring now to FIGS. 8A-8B, an example of an ETX computation strategy of a node being adjusted by a supervisory device is shown, according to various embodiments. In some embodiments, a node may be configured to report its ETX computation strategy to a supervisory device (e.g., the FAR/Root node, an NMS, etc.). For example, as shown in FIG. 8A, node 34 may provide its ETX strategy 802 to the NMS (e.g., in servers 150), the Root node, or any other device configured to supervise the rate limiting of ETX samples by any of nodes 11-45. In general, ETX strategy 802 includes any information or parameters used by node 34 to rate limit its ETX samples. For example, ETX strategy 802 may indicate a sample timeout parameter, a token bucket size, information regarding how node 34 rate limits ETX samples in conjunction with a channel hop, information regarding how node 34 rate limits ETX samples in conjunction with detected channel activity/events, or any other information that may be used to represent how node 34 rate limits its ETX samples. In one embodiment, ETX strategy 802 may be sent in a compressed manner via a CoAP message to the supervisory device.

In response to receiving information regarding the ETX strategy used by a node, the supervisory device may determine whether the node should adjust its ETX calculation strategy (e.g., how the node rate limits its ETX samples). For example, as shown in FIG. 8B, the NMS or other supervisory device may determine that node 34 should adjust its ETX strategy and provide a notification 504 to node 34 that causes node 34 to adjust its ETX strategy. In one embodiment, the supervisory device may determine an optimal ETX computation strategy and instruct one or more nodes to dynamically adjust its ETX computation strategy, accordingly. In further embodiments, if the node does not support dynamically adjusting its ETX strategy, the supervisory device may provide the determined ETX computation strategy itself to a node.

A supervisory device may determine that a node should adjust its ETX strategy based on any number of factors. In one embodiment, the supervisory device may base the determination in part on how frequently routing topology changes associated with the node occur. For example, the DAG root may determine that a particular node is too aggressive in its ETX computation strategy and its calculated ETX metric fluctuates too often, resulting in corresponding changes in the routing topology. In one embodiment, the supervisory device (e.g., the DAG root, etc.) may observe the rate at which the network topology changes (e.g., based on the node reporting DIO messages too frequently, etc.), to determine whether the node's ETX strategy and/or computed ETX is being adjusted too frequently. In such a case, the central device may instruct the node to use a new ETX computation strategy.

Figure 9:
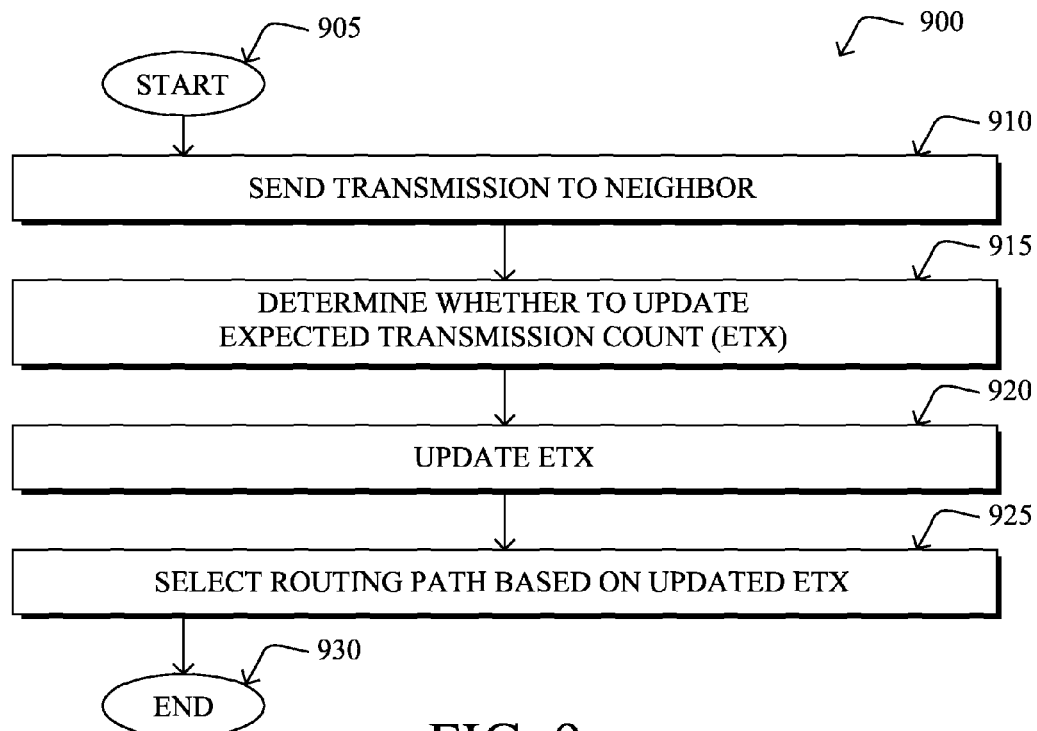
FIG. 9 illustrates an example simplified procedure for rate-limiting samples for ETX computations.

FIG. 9 illustrates an example simplified procedure for rate-limiting samples for ETX computations, in accordance with various embodiments herein. In general, procedure 900 may be performed by any node/device (e.g., node 200) in a network that calculates ETX metrics (e.g., for purposes of selecting routing paths, etc.). The procedure 900 may begin at step 905 and continues on to step 910 where, as described in greater detail above, the device obtains information regarding a transmission between the neighbor and a neighbor of the device. If, for example, the device sends the transmission to the neighbor, the information may indicate when the transmission was sent, the number of attempts the device has made to successfully send the data to the neighbor, whether or not the neighbor acknowledged the transmission, etc. Conversely, if the transmission was sent from the neighbor to the device, the received transmission may include information such as the number of attempts the neighbor made to send the data to the device. In some embodiments, the device and the neighbor may communicate using a channel hopping schedule in which both the device and its neighbor hop frequencies/channels.

At step 915, as detailed above, the device determines whether to update an ETX metric using information regarding the transmission sent in step 910. According to various embodiments, the decision to use or discard the ETX sample may be based on a rate of samples imposed by the device when computing expected transmission counts. In some cases, if the rate of samples obtained by the device exceeds a threshold amount at any given time, the device may simply discard the ETX sample (e.g., not use the sample to update the ETX metric). In various embodiments, the device may limit the rate by imposing a time delay between samples that are used or employ a token bucket mechanism, to control which ETX samples are used in the calculation.

In further embodiments, the device may adjust the rate of samples used to compute its ETX metrics, in response to the device hopping channels/frequencies. Notably, interference or other channel conditions that may affect the success of transmissions on one channel may not be present on another channel. In one embodiment, the device may reset its rate limiter after hopping channels (e.g., by resetting a timeout, by refilling a token bucket, etc.). In another embodiment, the device may switch to using a rate limit that is associated with the particular channel (e.g., the device may maintain separate rate limiters for each channel that it uses).

In yet further embodiments, the device may adjust the rate of ETX samples that it uses based on channel activity. For example, the device may monitor channel activity and determine whether transmission failures on the channel are correlated to an observed activity/event on the channel. In some cases, the device may use machine learning (e.g., a PCT strategy, etc.), to determine whether the activity is correlated to the transmission failure.

In some cases, the device may adjust its rate of ETX samples based on an instruction from a supervisory device. For example, the device may provide data regarding its sample rate to a FAR/Root node, an NMS, or other supervisory device configured to determine whether the ETX strategy used by the device is optimal. If not, the supervisory device may instruct the device to adjust its sample rate. In yet other embodiments, the device may adjust the sample rate based on the prior number of samples used to compute the ETX metric. For example, the device may use a high sample rate after first discovering the neighbor, but lower the rate as time goes on.

At step 920, the device updates its ETX metric, in response to determining that the information regarding the transmission should be used to update the expected transmission count, as described in greater detail above. In some embodiments, the device may simply compute an unweighted ETX value using the information regarding the transmission (e.g., as the inverse of the packet success rate). In other embodiments, the device may use a weighting, such as an EWMA, to update its ETX metric using the information regarding the sample.

At step 925, as described in greater detail above, the device uses the updated ETX metric to select a routing path. In some embodiments, the routing protocol used may incorporate an ETX metric into the path selection process. For example, an objective function used by an RPL-enabled node may cause the node to select a parent based in part on the expected number of transmission attempts it will take to successfully transmit to its parent (e.g., the ETX metric computed for the parent node). Procedure 900 then ends at step 930.

Figure 10:
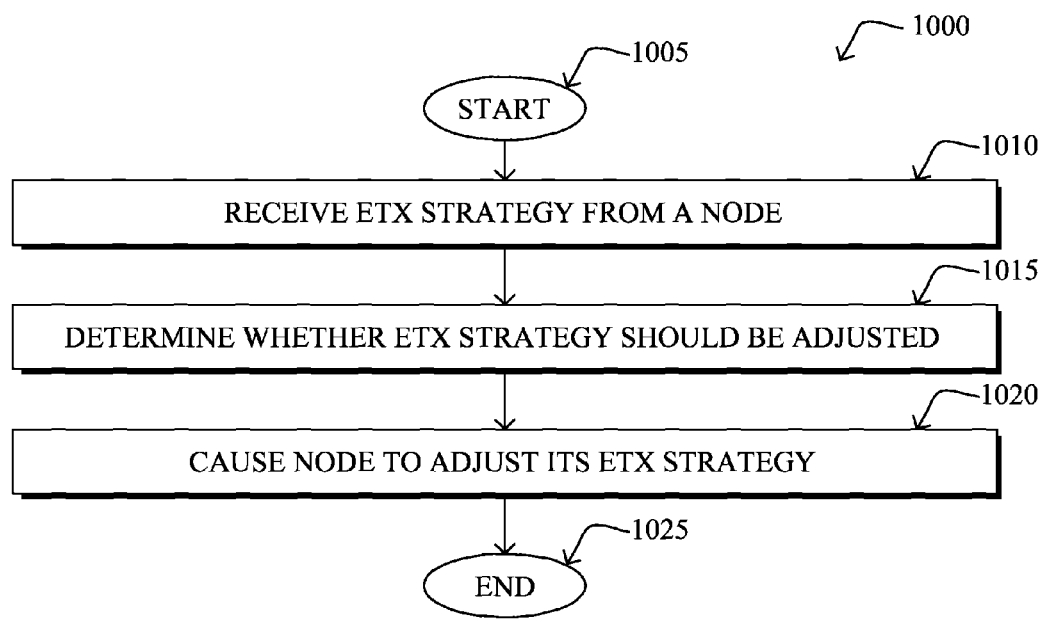
FIG. 10 illustrates an example simplified procedure for adjusting an ETX computation strategy.

FIG. 10 illustrates an example simplified procedure for adjusting an ETX computation strategy, in accordance with various embodiments herein. In general, procedure 1000 may be performed by a supervisory device configured to manage the ETX calculation strategy of one or more nodes in a network. The procedure 1000 may begin at a step 1005 and continue on to step 1010 where, as described in greater detail above, the device receives data regarding the ETX strategy used by a node in the network. In general, the data may include any information regarding how the node computes its ETX metrics. For example, the data may indicate whether the node rate limits its ETX samples, how the node rate limits the samples (e.g., by imposing a delay time between samples, by using a token bucket mechanism, etc.), parameters associated with the degree of rate limiting imposed by the node (e.g., the amount of delay or tokens, etc.), a history of changes the ETX strategy implemented by the node, combinations thereof, or the like. In further embodiments, the data regarding the ETX strategy may indicate whether the node employs mechanisms that take into account the use of channel hopping in the network. For example, the data indicative of the ETX strategy may indicate whether the node resets its ETX sample rate limiter after hopping channels, suppresses the use of certain channels based on activity on a channel, etc.

At step 1015, the device determines whether the ETX strategy used by the node should be adjusted, as described in greater detail above. Notably, ETX metrics may be used by a node to make routing decisions and may affect the routing topology. If, for example, the device determines that routing topology changes associated with the node are occurring too often or too frequently, the device may determine that the ETX strategy used by the device should be adjusted.

At step 1020, the device causes the node to adjust the ETX strategy used by the node, as described in greater detail above. In various embodiments, the device may send an instruction to the node that causes the node to adjust its ETX strategy. In one embodiment, the instruction may be a generic instruction that instructs the node to increase or decrease its ETX sample rate. In another embodiment, the instruction may include one or more parameters determined by the device such as, e.g., a specific amount of delay the node should use between samples. In a further embodiment, the instruction may include an entire ETX strategy computed by the device and provided to the node. Procedure 1000 then ends at step 1025.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

Accordingly, the techniques herein provide for a device rate-limiting the input samples used by the device to compute an ETX link metric. As would be appreciated, the techniques herein may reduce bias in the ETX computation caused by MAC-layer mechanisms, such as quick retransmissions and packet trains. Such bias may occur since MAC-layer mechanisms (e.g., packet retransmissions, packet trains, etc.) introduce high temporal locality in the samples taken. Link characteristics also have high temporal locality. In other words, MAC-layer retransmissions or packet trains can cause a high number of samples in a short amount of time. Rate-limiting samples used as input to the device's ETX computation eliminates the temporal locality that causes bias in the ETX computation, providing overall better characterization of link quality, removing variance that can affect the route selection process, and efficiency of the routing protocol. In other words, the techniques herein not only improve the function of the device itself, but may also improve the function of the network as a whole.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly. Also, while the techniques generally describe a network device rate-limiting the input samples used in its ETX computations, the techniques may also be extended to the computation of any other link quality metric. For example, in other embodiments, signal strength estimations can also suffer from bias and time-based variance due to high variations in traffic rate. Link quality estimation (e.g., by computing preamble quality or bit-errors) can also suffer from the same bias and time-based variance. Using the rate-limiting filtering techniques herein may help mitigate bias and time-based variance from a large class of link quality estimation mechanisms, in further embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a device in a network, information regarding a transmission between the device and a neighbor of the device in the network;
    determining, by the device, whether to use the information regarding the transmission to update an expected transmission count associated with the neighbor based on a rate of samples used to compute expected transmission counts;
    adjusting, by the device, the rate of samples used to compute expected transmission counts based on a quantity of samples associated with the neighbor that were previously used to compute expected transmission counts;
    updating, by the device, the expected transmission count, in response to determining that the information regarding the transmission should be used to update the expected transmission count; and
    selecting, by the device, a routing path in the network based in part on the updated expected transmission count associated with the neighbor.

2. The method as in claim 1, wherein determining whether to use the information regarding the transmission to update the expected transmission count comprises:
    determining, by the device, that the rate of samples used to compute expected transmission counts exceeds threshold value; and
    determining, by the device, not to use the information regarding the transmission to update the expected transmission count, in response to determining that the rate of samples used to compute expected transmission counts exceeds the threshold value.

3. The method as in claim 1, further comprising:
determining, by the device, that the information regarding the transmission should not be used to update the expected transmission count based on the transmission occurring within a threshold amount of time after a transmission that was used to compute the expected transmission count.

4. The method as in claim 1, further comprising:
using, by the device, a token bucket to control the rate of samples used to compute expected transmission counts.

5. The method as in claim 1, further comprising:
switching, by the device, to a different channel used by the device to communicate with the neighbor; and
resetting, by the device, the rate of samples used to compute expected transmission counts, in response to switching to the different channel.

6. The method as in claim 1, further comprising:
detecting, by the device, a change in activity on a channel used by the device to communicate with the neighbor, wherein the device determines whether to use the information regarding the transmission to update the expected transmission count based in part on the detected change in the activity on the channel.

7. The method as in claim 6, wherein detecting the change in activity on the channel comprises:
determining, by the device, a degree of correlation between the activity that occurred on the channel and a transmission failure between the device and the neighbor, wherein the device determines not to use the transmission failure to update the expected transmission count when the activity that occurred on the channel and the transmission failure are correlated.

8. The method as in claim 1, further comprising:
providing, by the device, the rate of samples used to compute the expected transmission count to a second device in the network;
receiving, at the device, an instruction from the second device to adjust the rate of samples; and
adjusting, by the device, the rate of samples used to compute the expected transmission count, in response to receiving the instruction from the second device.

9. The method as in claim 1, wherein the information regarding the transmission comprises at least one of: an indication as to whether or not the transmission was acknowledged by the neighbor, an indication that the transmission is a retransmission, or an indication of the number of retransmission attempts made to send the transmission.

10. A method comprising:
receiving, at a first device in a network, data indicative of an estimated transmission count (ETX) strategy used by a second device in the network to compute ETX metrics;
determining, by the first device, whether the ETX strategy used by the second device should be adjusted; and
causing, by the first device, the second device to adjust the ETX strategy, in response to a determination that the ETX strategy used by the second device should be adjusted, wherein adjusting includes adjusting the rate of samples used to compute the ETX metrics based on a quantity of samples associated with the second device that were previously used to compute the ETX metrics.

11. The method as in claim 10, wherein determining whether the ETX strategy used by the second device should be adjusted comprises:
monitoring, by the first device, routing topology changes in the network associated with the second device; and
determining, by the first device, whether the routing topology changes within a specific time period exceed a threshold amount.

12. The method as in claim 10, wherein causing the second device to adjust the ETX strategy comprises:
providing, by the first device, a new ETX strategy to the second device.

13. An apparatus, comprising:
one or more network interfaces to communicate with a network;
a processor coupled to the one or more network interfaces and configured to execute a process; and
a memory configured to store the process executable by the processor, the process when executed operable to:
obtain information regarding a transmission between the apparatus and a neighbor of the apparatus in the network;
determine whether to use the information regarding the transmission to update an expected transmission count associated with the neighbor based on a rate of samples used to compute expected transmission counts;
adjust the rate of samples used to compute expected transmission counts based on a quantity of samples associated with the neighbor that were previously used to compute expected transmission counts;
update the expected transmission count, in response to determining that the information regarding the transmission should be used to update the expected transmission count; and
select a routing path in the network based in part on the updated expected transmission count associated with the neighbor.

14. The apparatus as in claim 13, wherein whether to use the information regarding the transmission to update the expected transmission count is determined by:
determining that the rate of samples used to compute expected transmission counts exceeds threshold value; and
determining not to use the information regarding the transmission to update the expected transmission count, in response to determining that the rate of samples used to compute expected transmission counts exceeds the threshold value.

15. The apparatus as in claim 13, wherein the process when executed is further operable to:
determine that the information regarding the transmission should not be used to update the expected transmission count based on the transmission occurring within a threshold amount of time after a transmission that was used to compute the expected transmission count.

16. The apparatus as in claim 13, wherein the process when executed is further operable to:
use a token bucket to control the rate of samples used to compute expected transmission counts.

17. The apparatus as in claim 13, wherein the process when executed is further operable to:
switch to a different channel used by the apparatus to communicate with the neighbor; and
reset the rate of samples used to compute expected transmission counts, in response to switching to the different channel.

18. The apparatus as in claim 13, wherein the process when executed is further operable to:

detect a change in activity on a channel used by the apparatus to communicate with the neighbor, wherein the apparatus determines whether to use the information regarding the transmission to update the expected transmission count based in part on the detected change in the activity on the channel.

19. The apparatus as in claim 18, wherein the process when executed is further operable to:
determine a degree of correlation between the activity that occurred on the channel and a transmission failure between the apparatus and the neighbor, wherein the apparatus determines not to use the transmission failure to update the expected transmission count when the activity that occurred on the channel and the transmission failure are correlated.

20. The apparatus as in claim 13, wherein the process when executed is further operable to:
provide the rate of samples used to compute the expected transmission count to a second apparatus in the network;
receive an instruction from the second apparatus to adjust the rate of samples; and
adjust the rate of samples used to compute the expected transmission count, in response to receiving the instruction from the second apparatus.

21. The apparatus as in claim 13, wherein the information regarding the transmission comprises at least one of: an indication as to whether or not the transmission was acknowledged by the neighbor, an indication that the transmission is a retransmission, or an indication of the number of retransmission attempts made to send the transmission.

22. An apparatus, comprising:
one or more network interfaces to communicate with a network;
a processor coupled to the one or more network interfaces and configured to execute a process; and
a memory configured to store the process executable by the processor, the process when executed operable to:
receive data indicative of an estimated transmission count (ETX) strategy used by a second apparatus in the network to compute ETX metrics;
determine whether the ETX strategy used by the second apparatus should be adjusted; and
cause the second apparatus to adjust the ETX strategy, in response to a determination that the ETX strategy used by the second apparatus should be adjusted, wherein adjusting including adjusting the rate of samples used to compute the ETX metrics based on a quantity of samples associated with the second device that were previously used to compute the ETX metrics.

23. The apparatus as in claim 22, wherein whether the ETX strategy used by the second device should be adjusted is determined by:
monitoring routing topology changes in the network associated with the second apparatus; and
determining whether the routing topology changes within a specific time period exceed a threshold amount.

24. The apparatus as in claim 22, wherein the apparatus causes the second apparatus to adjust the ETX strategy by:
providing a new ETX strategy to the second apparatus.

25. A tangible, non-transitory, computer-readable media having software encoded thereon, the software when executed by a processor on a device in a computer network operable to:
receive data indicative of an estimated transmission count (ETX) strategy used by a second device in the network to compute ETX metrics;
determine whether the ETX strategy used by the second device should be adjusted; and
cause the second device to adjust the ETX strategy, in response to a determination that the ETX strategy used by the second device should be adjusted, wherein adjusting includes adjusting the rate of samples used to compute the ETX metrics based on a quantity of samples associated with the second device that were previously used to compute the ETX metrics.

26. A tangible, non-transitory, computer-readable media having software encoded thereon, the software when executed by a processor on a device in a computer network operable to:
obtain information regarding a transmission between the device and a neighbor of the device in the network;
determine whether to use the information regarding the transmission to update an expected transmission count associated with the neighbor based on a rate of samples used to compute expected transmission counts;
adjust the rate of samples used to compute expected transmission counts based on a quantity of samples associated with the neighbor that were previously used to compute expected transmission counts;
update the expected transmission count, in response to determining that the information regarding the transmission should be used to update the expected transmission count; and
select a routing path in the network based in part on the updated expected transmission count associated with the neighbor.

* * * * *